June 9, 1964   A. P. MUSY   3,136,190
ADJUSTING DEVICE FOR THE TOOL OF A MACHINE TOOL
Filed Dec. 7, 1960   3 Sheets-Sheet 1

INVENTOR
ANDRÉ PAUL MUSY
BY
ATTORNEYS

June 9, 1964   A. P. MUSY   3,136,190
ADJUSTING DEVICE FOR THE TOOL OF A MACHINE TOOL
Filed Dec. 7, 1960   3 Sheets-Sheet 2
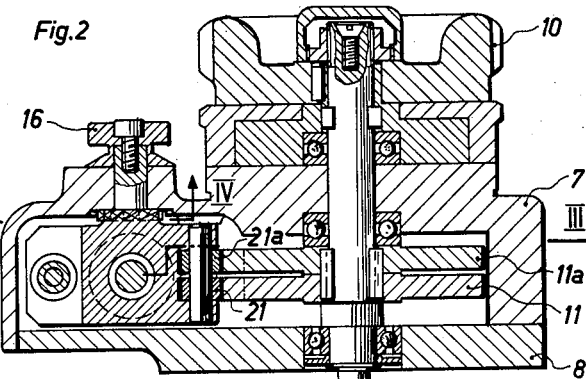
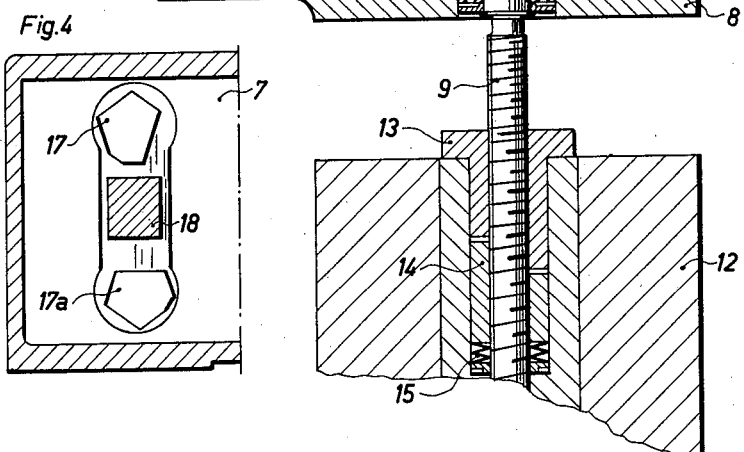
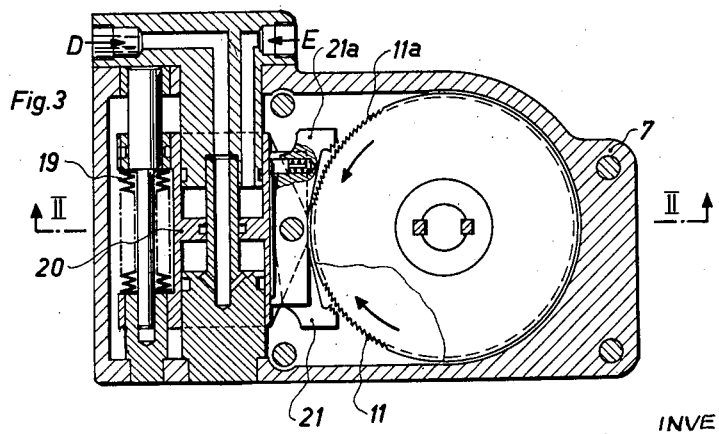
INVENTOR
ANDRÉ PAUL MUSY
BY
ATTORNEYS

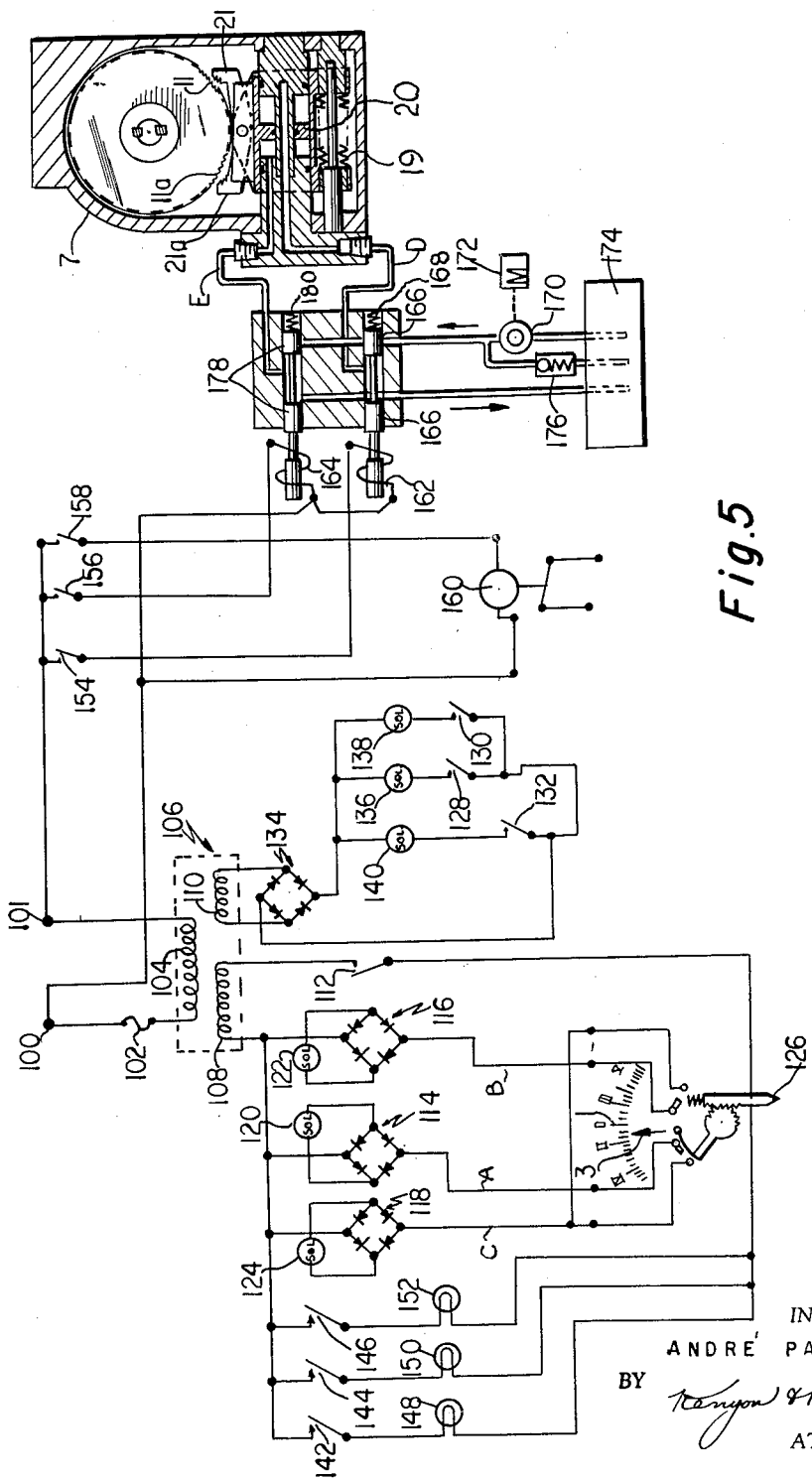

United States Patent Office
3,136,190
Patented June 9, 1964

3,136,190
ADJUSTING DEVICE FOR THE TOOL OF A MACHINE TOOL
André Paul Musy, Couvet, Neuchatel, Switzerland, assignor to Edouard Dubied et Cie (Société Anonyme), Couvet, Neuchatel, Switzerland
Filed Dec. 7, 1960, Ser. No. 74,321
Claims priority, application Germany Dec. 8, 1959
4 Claims. (Cl. 82—24)

The present invention relates to an adjusting device for the tool of a machine tool, and more particularly for a lathe, having a measuring device intermittently checking the relative positions of the tool and of the work.

In machine tools, and more particularly in lathes electrical measuring devices are known which after the work has been finished intermittently check the latter and transform the result of the measuring into control orders for the automatic adjusting device of the slide provided that the work exceeds on either side such tolerance.

The present invention has for its prime object the realisation of an adjusting device for the tool of a machine tool permitting in most simple manner to obtain optimum economical conditions by appropriately controlling by means of a hydro-mechanical pawl switching an adjusting spindle arranged without play in order to obtain without any loss of time an automatic adjustment of the tool axially with respect to the direction of movement thereof.

According to the invention the adjusting device for the tool of a machine tool arranged in the machine slide comprises a control piston with abutment both being controllable by a pulse of the measuring device from their middle position defined by plate springs in one of the two directions of movements and back into the starting position the abutment thereby cooperating with stroke limiting gauges and the piston thereby controlling a pawl switching device connected with the adjusting spindle of the machine slide.

Preferably the adjusting spindle for the machine slide is adjustable in both rotational directions as well automatically by means of pawls and jack discs as also by means of a hand wheel.

A further feature of the invention consists in the cooperation in the transverse bar of the main slide of a stationary nut part and a spring loaded moveable nut part with the adjusting spindle in order to exclude any axial play between the adjusting spindle and the said nut.

According to a further feature of the invention the stroke limiting gauges of the piston abutment hydraulically controllable from the middle position are adjustable each by a rotating button.

Other features and advantages of the invention will become apparent from the description now to follow, of a preferred embodiment thereof given by way of example only, and in which reference will be made to the accompanying drawing, in which:

FIGURE 2 is a longitudinal section through the transverse bar of the main slide of the machine tool and through an adjusting device for the tool thereof taken along the line II—II of FIGURE 3.

FIGURE 3 is a cross-section through the adjusting device of the tool taken along the line III—III of FIGURE 2, and FIGURE 4 is a cross-section through the casing of the adjusting device taken along the line IV—IV of FIGURE 2.

FIGURE 5 is a schematic diagram of one embodiment of the electro-hydraulic control circuit and its relation to a measuring device and an adjusting device.

Figure 1:
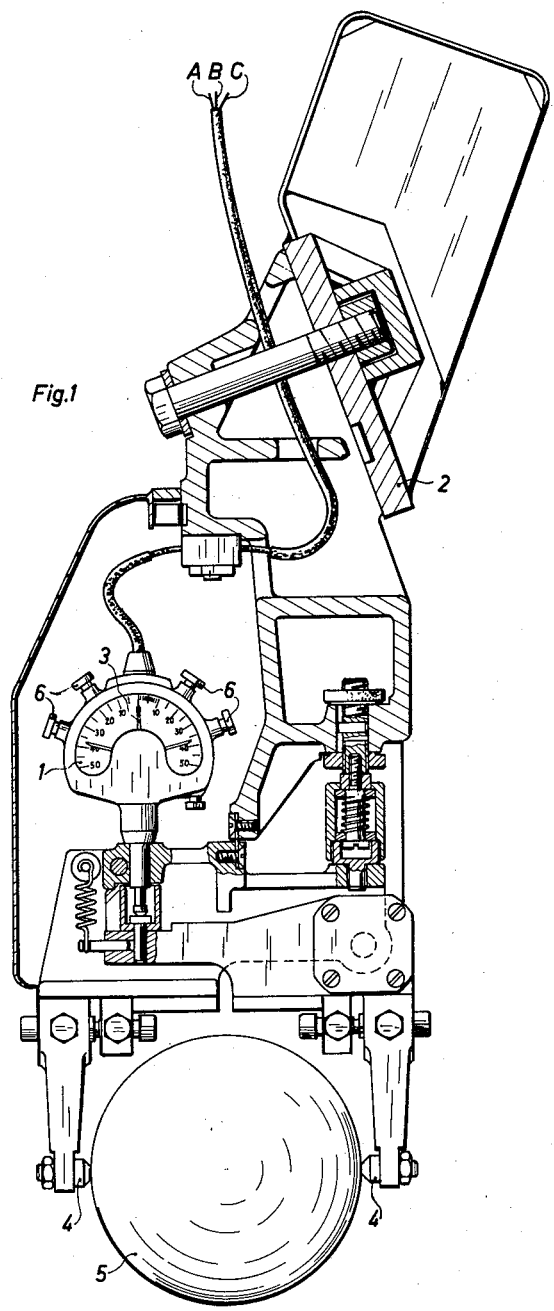
FIGURE 1 is a lateral view of a measuring device secured to an arm of a loading and unloading device for the work treated by a machine tool.

Referring now to the drawings in FIGURE 1 thereof reference numeral 1 designates a conventional electrical measuring apparatus arranged on the unloading arm 2 of a loading and unloading device for the work treated by the machine tool. Such conventional electrical measuring apparatus is disclosed and shown in German Patent No. 1,034,372 of July 17, 1958 issued to Carl Mahr and also in Swiss Patent No. 276,747 of October 16, 1951 issued to Carl Mahr. Reference numeral 3 designates the hand of the measuring apparatus and reference numeral 4 designates callipers or keys intermittently set under tension in order to check the work 5 after it has been finished, i.e. after it has been discharged from the chucks of the machine tool by the unloading arm 2. By means of a fine adjustment 6 appropriate contact levers for the circuit of each of leads A, B or C in the measuring apparatus 1 may be set. The electric pulses generated in the leads A and B, respectively, control relays as well as electro-valves and subsequently the adjusting device according to the invention for advancing and retracting respectively the work slide and the tool.

The pulses generated in the lead C in turn are produced when the tolerance is exceeded in the one or in the other direction and they are connected to control a relay and the switching box to bring the machine to stop. Thereby the callipers 4 remain engaged with the work 5 and the errors or false dimension is indicated by the hand 3 on the graduation of the measuring apparatus.

If however the measuring results are within a narrow tolerance space including the nominal value the measuring apparatus will not generate pulses.

In FIGURES 2–4 references D and E designate feed conduits for a fluid, for example pressure oil, for the advance or feed and for the retracting of the tool respectively. The casing of the adjusting device mounted in the tool slide 8 of the machine tool is designated by reference numeral 7 and the adjusting spindle arranged in the tool and main slide is designated by 9. To this adjusting spindle 9 is connected the hand wheel 10 and jack discs 11, 11a. In the transverse bar 12 of the main slide there are arranged stationary nut 13 as well as movable nut 14 loaded by a pressure spring 15.

This arrangement serves to exclude any axial play between the adjusting spindle 9 and the nuts 13, 14 and of the pressure spring 15 cooperating therewith. Consequently the connection between the transverse bar 12 of the main slide and the tool slide 8 is free from any play permitting a very accurate automatic adjustment of the tools in both axial directions by the hand wheel 10.

Rotating buttons 16 provided with graduation discs serve to adjust the stroke limiting gauges 17, 17a. The abutment 18 of the piston is maintained in the starting position between the said gauges by means of plate springs 19. One piston 20 controls the pawls 21, 21a which are brought to engagement individually and for a short period with the corresponding jack discs 11, 11a respectively.

As the work 5 after its finishing has attained its largest dimension the latter is transmitted by the callipers 4 to the hand 3 of the measuring apparatus 1 and the associated contact lever intermittently closes a circuit in the measuring apparatus 1 resulting in the generation of a pulse in lead A. This controls a relay and an electro-valve so that pressure fluid is fed through conduit D to piston 20, whereby the latter is displaced from the represented starting or middle position in direction towards the stroke limiting gauge 17 until the piston abutment 18 abuts this gauge. As the piston moves in the above manner the pawl 21 is brought to engagement with the jack disc 11 and the latter is rotated in clockwise direction together with the adjusting spindle 9. Thus a feed of the tool slide 8 is obtained and consequently also the required tool adjustment. Hereafter the plate springs 19 return the abutment 18 together with the piston 20 and the pawl 21 into the starting position shown in FIGURE 3.

If on the contrary the work 5 after it has been finished reaches the allowed smallest dimension it is lead B which transmits a pulse. The pressure fluid then flowing through conduit E displaces the piston abutment 18 in direction towards the stroke limiting gauge 17a and the pawl 21a engages the jack disc 11a rotating the latter together with the adjusting spindle 9 in counterclockwise direction. The last-mentioned movements produce the retraction of the tool slide 8, i.e. the required tool adjustment.

FIGURE 5 illustrates one embodiment of the electro-hydraulic control circuit just discussed and its relation to the measuring and the adjusting apparatus. In this circuit, 220 volts A.C. are applied across terminals 100 and 101 and thereby also across fuse 102 and primary winding 104 of transformer 106. The 220 volts A.C. across the said primary winding induces approximately 6 volts A.C. across secondary winding 108 and 26 volts A.C. across secondary winding 110.

During the measuring operation, contacts 112 close intermittently for periods of about two seconds each. When contacts 112 are so closed, depending upon the position of hand 3 of the measuring apparatus, a circuit is completed from secondary winding 108 through either lead A, B or C and bridge rectifier 114, 116 or 118, respectively, and solenoid 120, 122 or 124, respectively.

Hand 3 is so connected to bar 126, and bar 126 is in turn so connected to callipers 4 (not shown in FIGURE 5) that the position of hand 3 is a direct function of the dimension of the work being treated by the machine tool. If the desired dimensional tolerance for the work is exceeded, callipers 4 cause bar 126 to move so as to cause a circuit to be completed from secondary winding 108 through lead C. If the finished piece of work has the smallest allowable dimensions, bar 126 is so moved as to cause such a circuit to be completed with lead B. If the finished piece of work has the largest allowable dimensions, bar 126 is so moved as to cause such a circuit to be completed with lead C.

The particular bridge rectifier 114, 116 or 118 included in circuit with secondary winding 108 by movement of bar 126 rectifies the approximately 6 volt A.C. potential in secondary winding 108 into approximately 4.8 volts D.C. Current through the solenoid 120, 122 or 124 associated with the particular bridge rectifier closes contacts 128, 130, or 132, respectively. That is to say, when bridge rectifier 114 is in circuit, current passes through solenoid 120 and closes contacts 128; when bridge rectifier 116 is in circuit, current passes through solenoid 122 and closes contacts 130; and when bridge rectifier 118 is in circuit, current passes through solenoid 124 and closes contacts 132.

When either contacts 128, 130 or 132 are closed, bridge rectifier 134 rectifies the 26 volts A.C. across secondary winding 110 into approximately 24 volts D.C. The latter voltage is applied across the now-closed contacts 128, 130 or 132, and the control relay solenoid 136, 138 or 140 with which the closed contacts are in series. Energization of solenoids 136, 138 or 140 closes contacts 142, 144 or 146, respectively. When any one of the last-named contacts is closed, approximately 6 volts A.C. are applied across the control lamp 148, 150 or 152 with which the particular contacts are in series, thereby lighting one of the said lamps. Energization of solenoids 136, 138 or 140 also closes normally-open contacts 154, 156 or 158, respectively.

If solenoid 140 is energized and contacts 158 thereby closed, 220 volts A.C. are applied across solenoid 160, thereby stopping the machine. This occurs when the position of hand 3 indicates that the allowed tolerances for the work are exceeded. If solenoid 136 is energized, contacts 154 close and 220 volts A.C. are applied across electro-valve 162. If solenoid 138 is energized, contacts 156 close, and 220 volts A.C. are applied across electro-valve 164. In this way, pulses from the measuring apparatus are used to actuate electro-valves 162 and 164 and change the position of the tool.

When actuated, electro-valve 162 moves piston 166, depressing spring 168. Fluid under pressure is then supplied to pipe D through pump 170. Pump 170, driven by motor 172, furnishes pipe D with fluid from container 174. When electro-valve 162 is no longer energized, piston 166 is retracted by spring 168 and excess fluid flows back to container 174 through bypass 176. In a similar manner, when electro-valve 164 is energized, it moves piston 178, depressing spring 180, allowing fluid to be fed from container 174 to pipe E. As discussed earlier, when pipe D is fed with fluid, the tool is advanced; and when pipe E is fed with fluid, it is retracted.

I claim:

1. In a machine tool having a tool slide and an unloading arm associated therewith, an adjusting device for the tool of the machine tool mounted on the tool slide and measuring apparatus mounted on the unloading arm for intermittently checking the work, means for transmitting pulses from the measuring apparatus to the adjusting device effecting corrective operation of the adjusting device for the tool in response to said pulses and a machine slide including an adjusting spindle thereon, said adjusting device comprising a control piston therein provided with an abutment, springs for maintaining said control piston and abutment in a middle starting position and said control piston and abutment being movable in either direction from said middle starting position, means responsive to said pulses for effecting such movement, stroke limiting gauges for the piston and piston abutment to limit said movements from said middle starting position and a pawl switching device connected with said adjusting spindle of the machine slide operated by movement of said piston and abutment to effect an adjustment feed of the tool slide in an amount determined by the pulses from the measuring apparatus.

2. In the machine tool according to claim 1 including a hand wheel for the adjusting spindle and wherein said adjusting spindle is rotatable in either direction both automatically by said pawl switching device and manually by said hand wheel.

3. In the machine tool according to claim 2 including a transverse bar for the main slide of the machine tool, a stationary nut and a movable spring-loaded nut in said transverse bar cooperating with said adjusting spindle to exclude any axial play between said adjusting spindle and said nuts.

4. In the machine tool according to claim 1 including manually rotatable means for adjusting said stroke-limiting gauges and wherein hydraulic means for operating said piston and abutment from its middle starting position are provided.

References Cited in the file of this patent
UNITED STATES PATENTS

| | | |
|---|---|---|
| 208,712 | Brown | Oct. 8, 1878 |
| 458,325 | Gifford | Aug. 25, 1891 |
| 2,042,257 | Harrison et al. | May 26, 1936 |